(12) United States Patent
Salm

(10) Patent No.: US 8,456,107 B2
(45) Date of Patent: Jun. 4, 2013

(54) SPOTLIGHT AND METHOD OF LIGHTING UP AN OBJECT

(75) Inventor: Markus Salm, Heusweiler (DE)

(73) Assignee: GLP German Light Products GmbH, Karlsbad (DE)

( * ) Notice: Subject to any disclaimer, the term of this patent is extended or adjusted under 35 U.S.C. 154(b) by 396 days.

(21) Appl. No.: 12/692,746

(22) Filed: Jan. 25, 2010

(65) Prior Publication Data

US 2010/0188018 A1    Jul. 29, 2010

Related U.S. Application Data

(60) Provisional application No. 61/147,221, filed on Jan. 26, 2009, provisional application No. 61/165,063, filed on Mar. 31, 2009.

(30) Foreign Application Priority Data

Jan. 26, 2009 (EP) .................................... 09001044
Mar. 31, 2009 (EP) .................................... 09004739

(51) Int. Cl.
*G05F 1/00* (2006.01)
*H05B 39/00* (2006.01)

(52) U.S. Cl.
USPC ........................................ 315/307; 315/185 R

(58) Field of Classification Search
USPC .................. 315/312, 307, 291, 185 R, 185 S, 315/209 R; 362/800
See application file for complete search history.

(56) References Cited

U.S. PATENT DOCUMENTS

| | | | |
|---|---|---|---|
| 6,939,009 B2 * | 9/2005 | Fischer et al. | 353/43 |
| 7,344,279 B2 * | 3/2008 | Mueller et al. | 362/294 |
| 7,378,792 B2 * | 5/2008 | Huang et al. | 313/512 |
| 7,410,261 B2 * | 8/2008 | Magarill | 353/33 |
| 7,422,330 B2 * | 9/2008 | Magarill | 353/31 |
| 7,453,217 B2 * | 11/2008 | Lys et al. | 315/291 |
| 7,467,885 B2 * | 12/2008 | Grotsch et al. | 362/555 |
| 2007/0091271 A1 | 4/2007 | Hanano | |
| 2007/0139922 A1 | 6/2007 | Kuan et al. | |
| 2008/0266893 A1 | 10/2008 | Speier | |

FOREIGN PATENT DOCUMENTS

| | | |
|---|---|---|
| EP | 1 693 615 A1 | 8/2006 |
| EP | 1693615 A1 * | 8/2006 |
| JP | 2004-102132 A | 4/2004 |
| JP | 2004-341108 A | 12/2004 |
| JP | 2007-288169 A | 11/2007 |
| WO | 00/36336 A1 | 6/2000 |
| WO | 2008/021158 A2 | 2/2008 |
| WO | 2008/073728 A1 | 6/2008 |

OTHER PUBLICATIONS

Official Communication issued in corresponding International Application No. PCT/EP2010/050782, mailed on Apr. 8, 2010.

* cited by examiner

*Primary Examiner* — Minh D A
(74) *Attorney, Agent, or Firm* — Keating & Bennett, LLP

(57) ABSTRACT

Embodiments show a spotlight comprising light emitting diode modules wherein each LED module comprises at least two light emitting diodes with different light emission spectra and a light mixer, wherein each light mixer is arranged at one side of the light mixer in cooperation with an assigned LED module and each light mixer is configured to mix the different light emission spectra of the at least two LEDs of the assigned LED module to form a light beam, and wherein exit surfaces at the other side of the light mixers are arranged next to each other in a matrix with its light beams of the light mixers form a common light beam and a focusing optics for focusing the common light beam.

13 Claims, 15 Drawing Sheets

SPOTLIGHT AND METHOD OF LIGHTING UP AN OBJECT

SUMMARY OF THE INVENTION

Embodiments of the invention relate to a spotlight and a method of lighting up an object with such a spotlight. The technical field of the invention is related to the fields of optics in general, and particularly to spotlights, which are, for example, used as stage lights to light up an object, a person, or scenery. Such spotlights may be used, for example, for lighting up or creating special optical effects at certain events such as in theatres or dance halls. Further embodiments of the invention relate to controlling the light beam of such a spotlight in size, color, intensity, and composition.

High power light emitting diodes (LEDs) can be used for general lighting purposes, for example, also for spotlights, stage lighting, traffic lights and signals, automotive brake lights, etc. Emission spectra of different LEDs can be superimposed in order to change the color perception of an observer. By mixing the emission spectra of different LEDs, it is possible to create a light beam, which can comprise each color in the visible spectral range (700 nm to 400 nm wavelength), including a white-spectrum that may be a superposition of a red, a green and a blue emission spectrum.

For lighting up a stage or for other events it is desirable to have spotlights which are flexible and variable with respect to possible optical effects. This means, for example, a spotlight should be able to change the size and the shape of the spotlight beam, as well as, the color and the intensity of the light beam. In addition, the spotlight should be efficient with respect to power consumption and easy to control. Hence, there is a need for a spotlight that is configured to separately change the intensity, the color, as well as the size and the shape of an emitted light beam.

This technical problem is solved by embodiments of the invention providing a spotlight which is configured to emit a variable common light beam according to claim 1.

According to embodiments of the invention the spotlight comprises light emitting diode (LED)-modules with light-emitting-diodes (LEDs) comprising different emission spectra, wherein assigned light mixers are configured to mix the different light emission spectra of said LEDs to form a light beam, and wherein the different light beams of the light mixers form a common light beam of the spotlight. Embodiments of the invention further describe a method of lighting up an object with such a spotlight.

Other elements, features, steps, characteristics and advantages of the present invention will become more apparent from the following detailed description of the preferred embodiments with reference to the attached drawings.

BRIEF DESCRIPTION OF THE DRAWINGS

With reference to said accompanying FIGS. 1 to 6, embodiments of a spotlight and a method for lighting up an object will be described.

DESCRIPTION OF PREFERRED EMBODIMENTS

Figure 1:
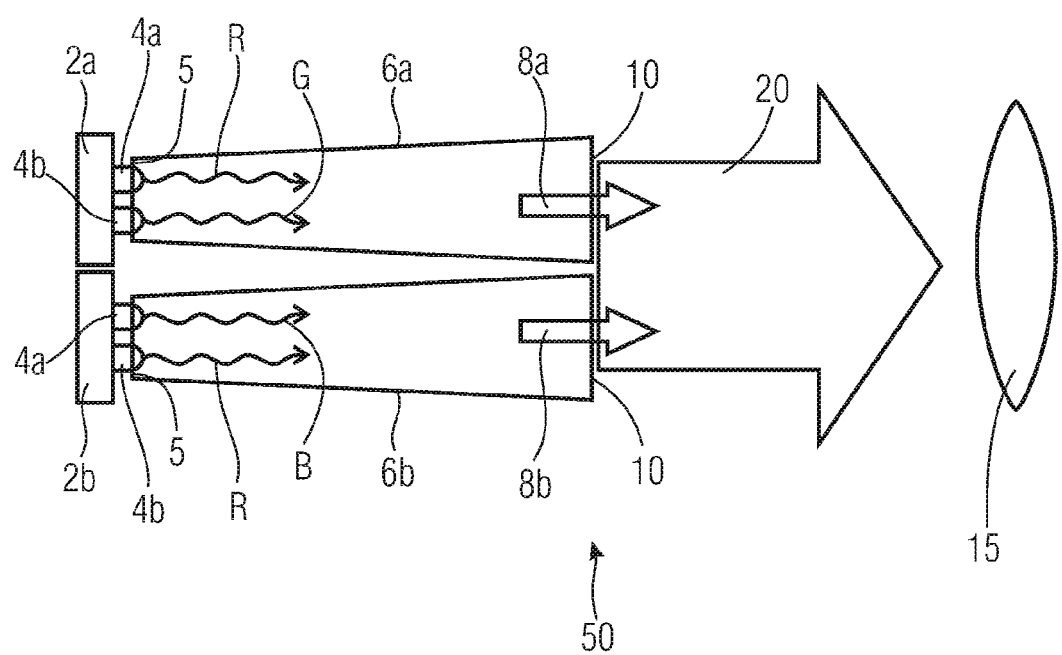
FIG. 1 shows a schematic cross-sectional view of a spotlight according to an embodiment.

With reference to the following description of the embodiments of the present invention, it is to be noted that for simplification reasons, the same reference numerals will be used in the different figures for functionally identical or similarly acting or functionally equal, equivalent elements or steps throughout the description.

In FIG. 1 a schematic spotlight 50 is depicted, wherein the spotlight 50 comprises light emitting diodes (LED) modules 2a, 2b, wherein each LED-module comprises at least two light emitting diodes 4a, 4b with different light emission spectra R, G, B. The spotlight may be arranged in a housing (not shown in FIG. 1). Additionally, the spotlight 50 comprises light mixers 6a, 6b, wherein each light mixer 6a, 6b is arranged at one side 5 of the light mixer 6a, 6b in cooperation with an assigned LED-module 2a, 2b. Each light mixer 6a, 6b is configured to mix the different light emission spectra R, G, B of the at least two LEDs 4a, 4b of the assigned LED-module 2a, 2b to form a light beam 8a, 8b, and wherein exit surfaces 10 at the other side of the light mixers 6a, 6b are arranged next to each other in a matrix so that the light beams 8a, 8b of the light mixers 6a, 6b form a common light beam 20. In addition the spotlight 50 comprises a focusing optics 15 for focusing the common light beam 20.

The LED-modules 2a, 2b provide LEDs 4a, 4b in a protective and mountable casing. The LEDs of an LED-module may comprise different light emitting spectra in the visible spectra range (wavelength: 750 nm to 350 nm). A first LED 4a of a first LED-module 2a may, for example, emit a red light emission spectrum; this means a red color R or red light. A second LED 4b of the first LED module 2a may emit, for example, a green light emission spectrum, i.e. a green color G or green light. A first LED 4a of a second LED module 2b may, for example, emit a blue light or emission spectrum B and a second LED 4b of the second LED module 2b may, for example, emit again a red light R.

In other embodiments of the invention, the LEDs may comprise other light emission spectra during operation, for example, a white emission spectrum or an amber spectrum. In general any combination of LEDs with emission spectra in the visible spectral range can be used. A LED-module may comprise a plurality LEDs. The LEDs may be high power light emitting diodes being capable of continuous use of powers above 1 Watt, for example, between 1 Watt and 10 Watt. The current consumption of such a high power LED in operation may be for instance between 0.5 A and 25 A, for example, between 1 A and 5 A.

The light mixers 6a, 6b are arranged at one side 5 in cooperation with an assigned LED-module 2a, 2b. The LED-modules are arranged close to the one side 5 of the light mixer, so that during operation of the LED modules, a high percentage of the emitted light of the LEDs is collected in the assigned light mixer. According to some embodiments of the invention, the percentage of the collected light may be up to 98% (ratio of collected photons to emitted photons). In other embodiments the percentage may be between 75% and 95%. In order to achieve a high collecting efficiency the LED-modules 2a, 2b may be attached to the light mixer 6a, 6b, for example, by an adhesive layer or they may be arranged in a distance, for example, less than 3 mm or less than 1 mm from the one side 5 of the assigned light mixer 6a, 6b.

A light mixer 6a, 6b is configured to mix the different light emission spectra R, G, B of the LEDs 4a, 4b of the assigned LED module 2a, 2b to form a light beam 8a, 8b. The mixing of the emission spectra may be performed in an additive manner. The light beam 8a may comprise, for example, a yellow emission spectrum, which is a superposition of the red emission spectrum R of the LED 4a, and the green emission spectrum G of the LED 4b of the first LED module 2a. In this embodiment, the second light beam 8b comprises, for example, a magenta colored emission spectrum, which is based on the superposition of the blue emission spectrum of the first LED 4a of the second LED module 2b and the red emission spectrum of the second LED 4b.

A light mixer 6a, 6b is configured to mix the emitted light spectra of the single LEDs 4a, 4b of an LED-module assigned to the light mixer. The mixture of the light which is emitted by the LEDs is achieved by an optical superposition of the emission spectra of the LEDs 4a, 4b in the light mixer 6a, 6b. Depending on the distance of the light mixer 6a, 6b to the LED-module 2a, 2b and on the sizes and relative distances of the LEDs 4a, 4b with respect to each other, a mixed light beam has a varying mixing degree, wherein the mixing degree of 100% corresponds to fully mixed light. Fully mixed light means, for example, the perception of a homogeneous orange colored light beam being produced by a red and an amber LED emission spectrum. The mixing degree of the emitted light can be controlled by the voltage that is applied to the respective LEDs during spotlight operation. If a LED, for example, LED 4a of the first module 2a is turned off and only the second LED 4b is turned on and emits a green emission spectrum, then the light beam 8a contains only the green emission spectrum of the LED 4b. If, for example, the voltage that is applied to the LED 4a is higher then a threshold voltage of the LED and hence, red light is emitted so that the superimposed light beam 8a comprises parts of the red emission spectrum of the LED 4a. An observer may percept the light beam 8a as yellow like color depending on the intensity of the red spectrum.

The light mixers 6a, 6b may be arranged in parallel within ±5° and the exit surfaces 10 of the light mixers 6a, 6b may be arranged next to each other in a matrix, a row or an array, wherein the light beams 8a, 8b of the light mixers 6a, 6b form a common light beam 20.

The light mixers 6a, 6b may be so-called light pipes or light guides which may be formed as a structure of an increasing cross-sectional area from one side 5 of the light mixer 6a, 6b, to the exit surfaces 10 at the other side of the light mixers 6a, 6b. The light mixer may have a tapered form, for example, a conical, a parabolic, hyperbolic, pyramidal, or some other geometrical form with an increasing cross-sectional area. According to other embodiments the light mixers may have a non-tapered from.

The cross-section of a light mixer may be rectangular, for example, quadratic or round. The inner part of the light mixers 6a, 6b can be hollow, and the walls of the light mixers 6a, 6b can be highly reflective to avoid the absorption of light by the walls and to assist in beam shaping and color mixing.

According to some embodiments, the walls of the light mixers 6a, 6b may be coated with a reflective layer, or may be mirrored. The light mixer may be configured to additively mix the incoming light of the LEDs and to minimize the loss of the emitted light by collecting the emitted photons and by suppressing, by means of total reflection at the walls of the light mixer, the escape of emitted photons.

According to another embodiment the walls of the light mixer or parts of the wall may be optically active, for example, by a phosphor coating. A reflective coating or mirrored internal surface may provide for a desired level of reflectivity of the light mixer. The reflective coating may be made of a highly reflective material, for example, protective aluminum or protective silver.

According to some embodiments, the walls of the light mixers 6a, 6b are made of a material having a higher refraction index than the refraction index of air, i.e. a refraction index higher than 1. Due to this the light beam may be totally reflected within the light mixer depending on the incident angle, and the efficiency of the spotlight can therefore be increased. The light mixer may be made of solid or hollow material. The material which is used to form the light mixers 6a, 6b may, for example, comprise ultra violet transmitting (UVT) acrylic or acrylic (PMMA), glass, polycarbonate, Perspex, or any other plastic material. The light mixer may be filled with gas under pressure, such that a high refraction index of the mixer with respect to the refraction index of air is achieved.

The common light beam 20 that is formed by the single light beams 8a, 8b passes the focusing optics 15 before the common light beam is projected on a projection screen or an object. The focusing optics may comprise at least one lens or a lens system. The lens or the lens system may comprise a concave, a convex, an objective lens, a zoom lens, or other optical elements, which are suitable for affecting the common light beam. The focusing optics 15 can be configured to image the light output of the light mixer on a projection screen or an object during operation. The lens or the lens system may have a diverging or collecting characteristic for the common light beam. The common light beam may be refracted or diffracted by the focusing optics 15.

Figure 2:
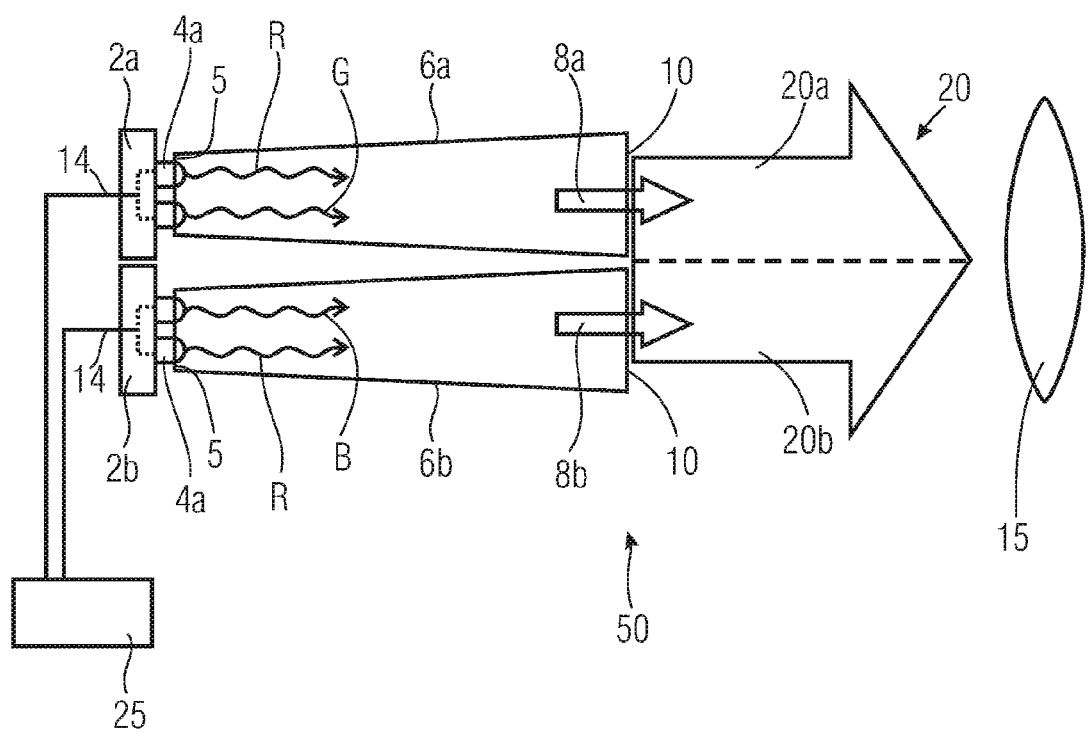
FIG. 2 shows a cross-sectional view of a spotlight including an electrical control unit according to another embodiment of the invention.

FIG. 2 shows a schematic cross-sectional view of a spotlight 50, as described in connection with FIG. 1. The spotlight 50 comprises light emitting diode modules 2a, 2b, wherein each LED-module comprises two light emitting diodes 4a, 4b. The light mixers 6a, 6a are arranged in parallel and the exit surfaces 10 of the light mixer 6a, 6b are arranged close to each other in an array or matrix. As a consequence the light beams 8a, 8b of the respective mixed LED spectra form together the common light beam 20. The exit surfaces 10 of the light mixers may touch each other or may be arranged spaced apart from each other. The distance between the exit surface edges may be between 0 mm and 3 mm. An adhesive layer or glue may be used to connect at least one side of an exit surface of a light mixer with an exit surface of another light mixer.

In the embodiment, shown in FIG. 2, the spotlight 50 may comprise an electrical control circuit 25 which is electrically coupled to each LED 4a, 4b of each LED module 2a, 2b. The electrical control circuit 25 is configured to control the different light emission spectra R, G, R, B of the at least two LEDs 4a, 4b in each LED module. The electrical control circuit 25 may be configured to separately change the intensity and/or the color of the light beams 8a, 8b of each LED module 2a, 2b so that the common light beam 20 comprises separately in color and intensity adjustable light beams 20a, 20b.

The electrical control circuit 25 is configured to control the current-voltage curve of each LED. This means, for example, a higher voltage which is applied to a first LED 4a may then result in a higher intensity of the red emission spectra R compared to an intensity of the green emission spectra G of the second LED 4b. As a consequence, the mixed light beam 8a may comprise a higher portion of the red emission spectra of the first LED 4a.

The common light beam 20 may comprise a first portion 20a which consists of a color which is determined by the superposition of the light emitting spectra of the first and the second LED 4a, 4b of the first mixer 6a. The common light beam 20 may furthermore comprise a second portion 20b which comprises a color which is determined by the superposition of the light emitting spectra of the first 4a and the second 4b LED of the second module 2b.

The electrical control circuit 25 may be integrated in the spotlight, or according to another embodiment the electrical control circuit may be externally arranged and may be coupled to electrical terminals 14 of the LED-modules 2a and 2b.

The electrical control circuit 25 may be configured to control the different light emission spectra of the at least two LEDs 4a, 4b in the LED modules 2a, 2b, so that in a first state of a multi-color mode the common light beam 20 comprises a first color, and in a second state, a second color.

In a multi-color mode the electrical control circuit can control the spotlight so that the light beams 8a and 8b have the same color or emission spectra, and hence, the common light beam 20 is a uniform colored beam, shining in a first color. In another state this color of the common light beam may change. For example, in a first state of a multi-color mode the common light beam 20 may have a red color and in a second state of the multi-color mode the common light beam 20 may have a blue color. The electrical control circuit may be configured to control each LED of each LED module so that the assigned light beams 8a, 8b have the same mixed light emission spectra, and hence, the common light beam 20 has the same uniform light emission spectrum too.

According to other embodiments, the electrical control circuit 25 is configured to control the different light emission spectra of the at least two LEDs 4a, 4b in the LED modules 2a, 2b so that in a color patch mode, a first light beam 8a of a first LED module 2a comprises a first color and a second light beam 8b of a second LED module 2b comprises a second color. Thus, the common light beam 20 comprises a first portion 20a in a first color and a second portion 20b in a second color. The intensity and/or the color temperature of the first portion 20a and the second portion 20a of the common light beam 20 are separately adjustable by the electrical control circuit.

In the color patch mode the common light beam 20 can consist of separate light beams 8a, 8b, which form together the common light beam 20 and wherein the light beams 8a, 8b are shine in different colors. This means, they have different emission spectra, wherein the exact emission spectra depend on the current-voltage control of the assigned LEDs 4a, 4b in the respective LED modules 2a, 2b.

Figure 3A:
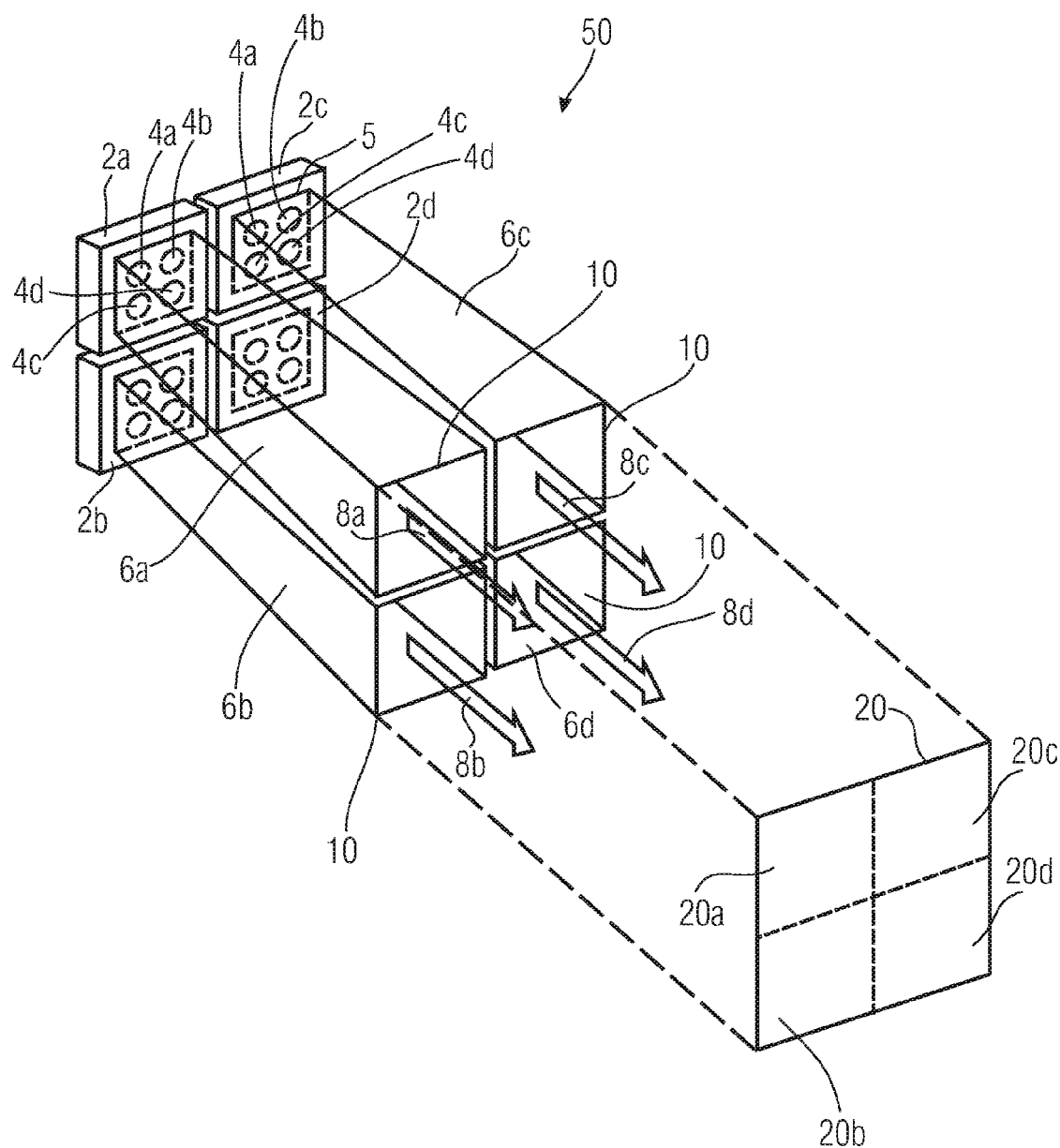
FIG. 3a shows a schematic perspective view of a spotlight with four LED-modules forming a common light beam according to an embodiment.

FIG. 3a shows a schematic perspective view of a spotlight 50 which comprise four LED-modules 2a, 2b, 2c, and 2d, wherein each LED-module comprises four LEDs 4a, 4b, 4c and 4d. Each LED-module 2a, 2b, 2c and 2d comprises an assigned light mixer 6a, 6b, 6c and 6d, wherein the exit surfaces 10 of the light mixers are rectangular, for example, quadratic so that the assigned light beams 8a, 8b, 8c, and 8d have a respective rectangular, for example, quadratic shape. As a consequence, the common light beam 20 also comprises a rectangular shape, for example, a quadratic shape. Due to the rectangular exit surfaces 10 of the light mixers, the light beams 8a, 8b, 8c and 8d form a rectangular common light beam 20.

The light mixers 6a, 6b, 6c and 6d are arranged in a 2×2 matrix wherein the rectangular common light beam 20 is formed by the four light beams 8a, 8b, 8c, 8d of the four light mixers 6a, 6b, 6c and 6d and wherein each LED module 2a, 2b, 2c and 2d, which is assigned to a light mixer comprises four LEDs 4a, 4b, 4c and 4d. In general a spotlight may comprise a n×m matrix of light mixers with assigned LED-modules, wherein n=2, 3, 4, . . . and m=1, 2, 3, . . . .

A first LED 4a may have a red light emission spectra R and a second LED 4b may have a green light emission spectra G during operation. A third LED 4c may comprise a blue emission spectra B and a fourth LED 4d may comprise a white W or amber A light emission spectra during operation. An electrical control circuit (not shown in FIG. 3a) can now be used to control each LED 4a, 4b, 4c, 4d in an LED-module to generate, by means of the assigned light mixer, each color in the visible spectra range by an additive mixture or superposition of the single emission spectra of the LEDs 4a, 4b, 4c and 4d.

Due to the rectangular exit surfaces 10 of the light mixers 6a, 6b, 6c and 6d, the light beam 20 may have a rectangular shape and a projection of the rectangular common light beam 20 on a projection screen may have a rectangular shape as well, i.e. the common light beam has an rectangular spot.

According to some embodiments, an electrical control circuit 25 may be configured to control the different LEDs of the different LED modules 2a, 2b, 2c and 2d so that in a first state of a multi-color mode, each emitted light beam 8a, 8b, 8c and 8d comprises the same color, i.e. the same mixed emission spectra. Hence, the common light beam 20 and the respective projection on a projection screen is a rectangular uniform colored spot. In a second state, the electrical control circuit may change the color of the common light beam, so that the common light beam 20 and the projected spot of the common light beam is then shining in a different second color.

According to some embodiments, the electrical control circuit can also be configured to control the LEDs of each single LED module 2a, 2b, 2c and 2d so that each light beam 8a, 8b, 8c and 8d can comprise a different color based upon the mixed light emission spectra of the assigned LEDs. As a consequence, the common light beam 20 can consist of different light beams or portions 20a, 20b, 20c, 20d, with a different color, intensity, and/or color temperature. A respective light spot of such a common light beam 20 would then comprise different separated colors.

In a color patch mode a common light beam 20 can, for example, comprise a first portion 20a in a white color, a second portion 20b in an orange color, a third portion 20c in a green portion, and a fourth portion 20d in a violet color. The intensity, the color and the color temperature of each portion 20a, 20b, 20c and 20d of the common light beam 20 can be individually controlled by an electrical control circuit. If the common light beam 20 comprises, for example, a rectangular shape an individual, adjustable color and brightness can be allocated to each quadrant of the common light beam.

Figure 3B:
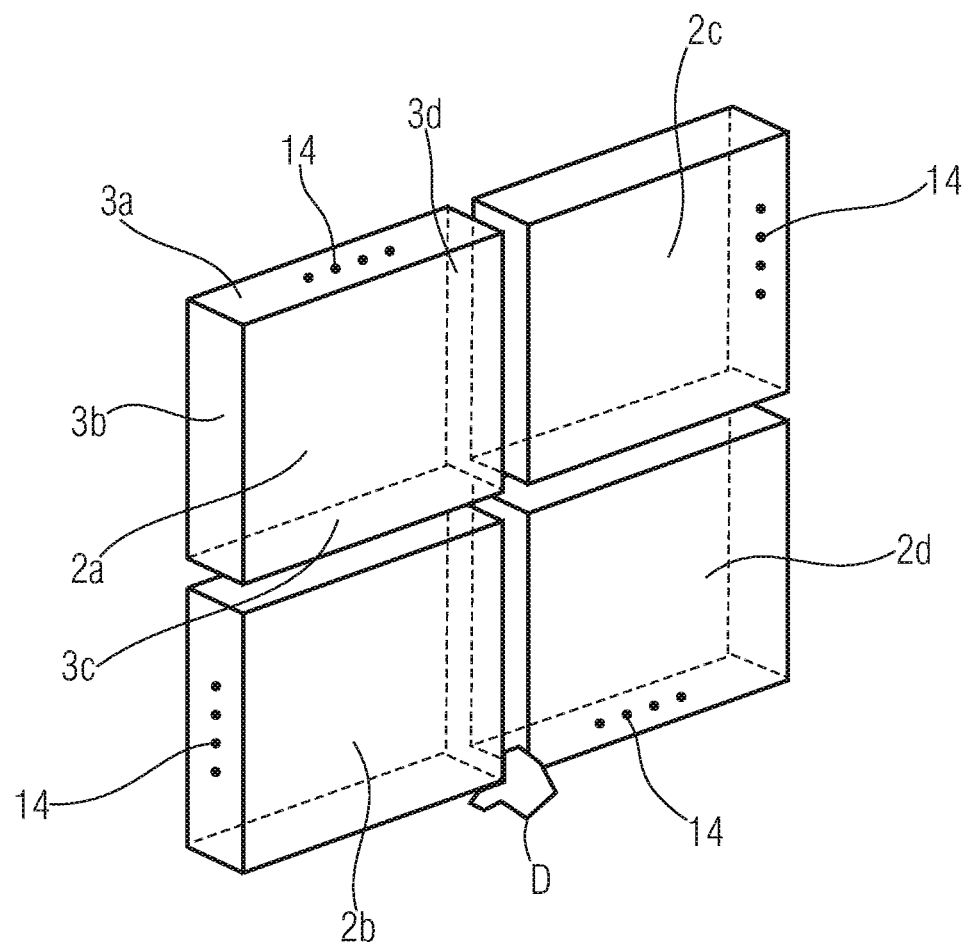
FIG. 3b shows a schematic view of four LED-modules each comprising electrical terminals for an electrical control circuit according to an embodiment.

FIG. 3b shows a schematic detailed drawing of four LED-modules 2a, 2b, 2c and 2d. Each LED-module is rectangular and comprises at one of the four sidewalls 3a, 3b, 3c and 3d an electrical terminal 14 that is for coupling an electrical control circuit 25 (not shown in FIG. 3b) to the LED-module. The LED-modules 2a, 2b, 2c and 2d are arranged next to each other forming a combined rectangular 18 (see FIG. 3c). The distance D between the sidewalls of the LED-module may be smaller than 3 mm or smaller than 1 mm. The LED-modules may touch each other. According to some embodiments two sidewalls of each LED-module touch sidewalls of two other LED-modules.

Figure 3C:
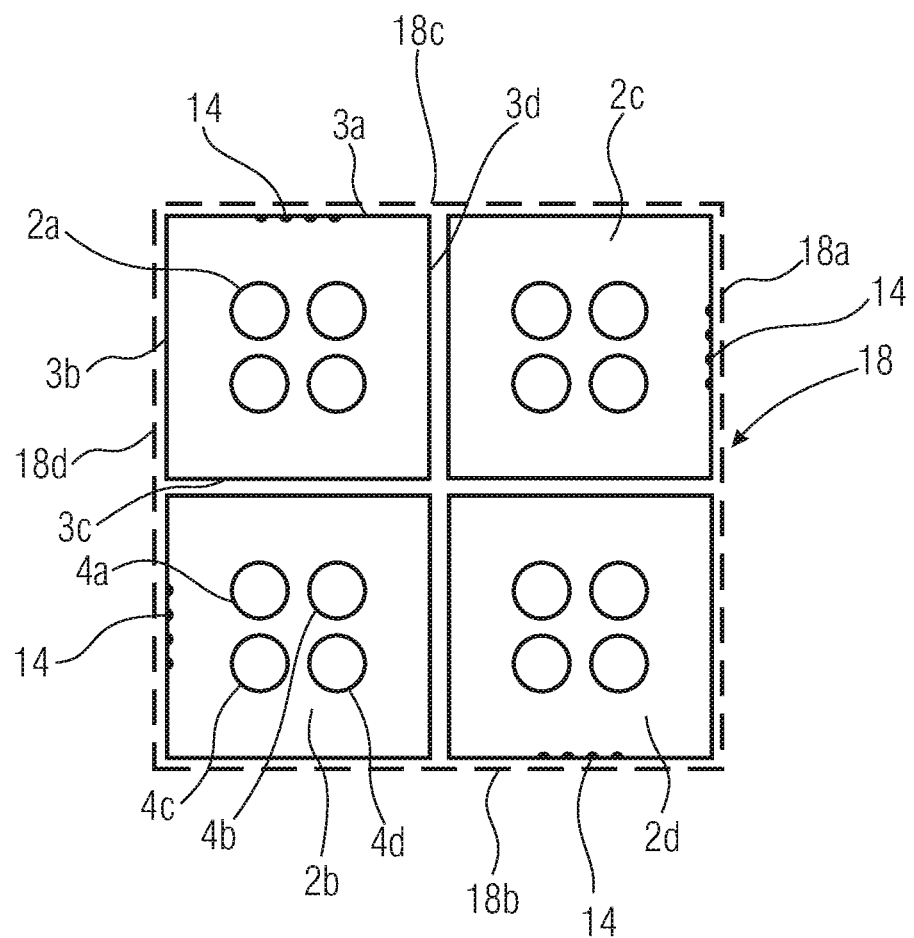
FIG. 3c shows a schematic top view of four LED-modules arranged next to each other according to an embodiment of the invention.

In FIG. 3c the schematic top view of four quadratic LED modules 2a, 2b, 2c and 2d is shown. Each LED-module may comprise four LEDs 4a, 4b, 4c and 4d. The LED-modules are arranged next to each other so that they form a combined rectangular 18. Each LED-module comprises an electrical terminal so that the LED-module can be connected to an electrical control circuit 25. The four LED-modules 2a, 2b, 2c and 2d are arranged so that at each side of the combined rectangular 18a, 18b, 18c and 18d, an electrical terminal 14 of one of the four LED-modules is arranged. Due to this arrangement, each LED module can easily be coupled to an electrical control circuit. Each module may be coupled by means of an electrical plug and an electrical cable to an external electrical control circuit.

Figure 3D:
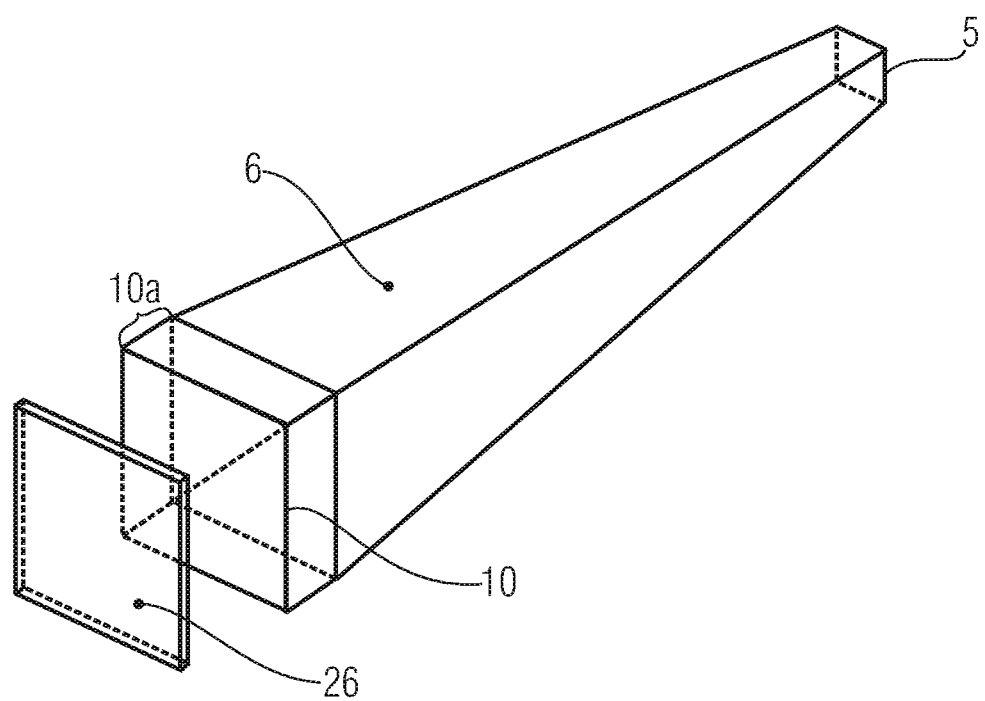
FIG. 3d shows the schematic perspective view of a light mixer according to an embodiment of the invention.

In FIG. 3d the perspective view of a light mixer 6 is depicted. According to this embodiment, the light mixer comprises a tapered form with an increasing cross-sectional area starting at one end 5 of the light mixer 6 up to the exit surface 10. In this embodiment, the light mixer 6 comprises a pyramidal form, wherein the exit surface 10 comprises a straight segment 10a so that the light mixers can easily be attached to each other in a matrix (see FIG. 3a). The light mixer 6 may furthermore comprise a lenslet 26, which may act as a mixing structure 26 which is configured to mix the light passing the exit surface 10 of the light mixer 6. The lenslet may be formed as a diffuser having a plurality of lens features which are used for mixing the light passing the exit surface 10 of the light mixer 6.

Figure 3E:
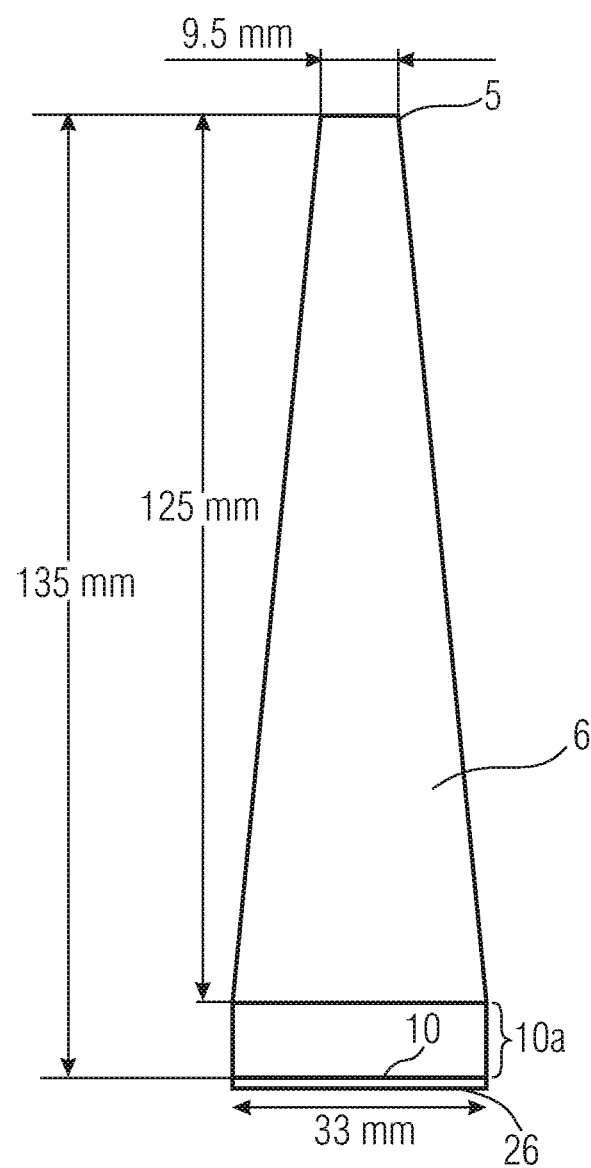
FIG. 3e shows a schematic side view of a light mixer with dimensions according to an embodiment of the invention.

In FIG. 3e the side view of a light mixer 6 is depicted. According to this embodiment, the light mixer comprises a length of 135 mm including the straight segment 10a of the exit surface 10. The tapered length of the light mixer 6 is in this embodiment 125 mm. The width at the one end 5 of the light mixer is 9.5 mm. According to other embodiments, this dimension may of course vary. The length of the light mixer may, for example, be between 10 mm and 500 mm. The width at the end 5 of the light mixer 6, which is attached or close to an LED module, may be between 2 mm and 30 mm. The width of the exit surface 10 may be 33 mm and according to other embodiments, the width of the exit surface 10 may be between 5 mm and 100 mm. The mixing structure 26 may be attached to a light mixer by means of a bonding material, for example, a glue, such as a silicon-elastomer.

Figure 4A:
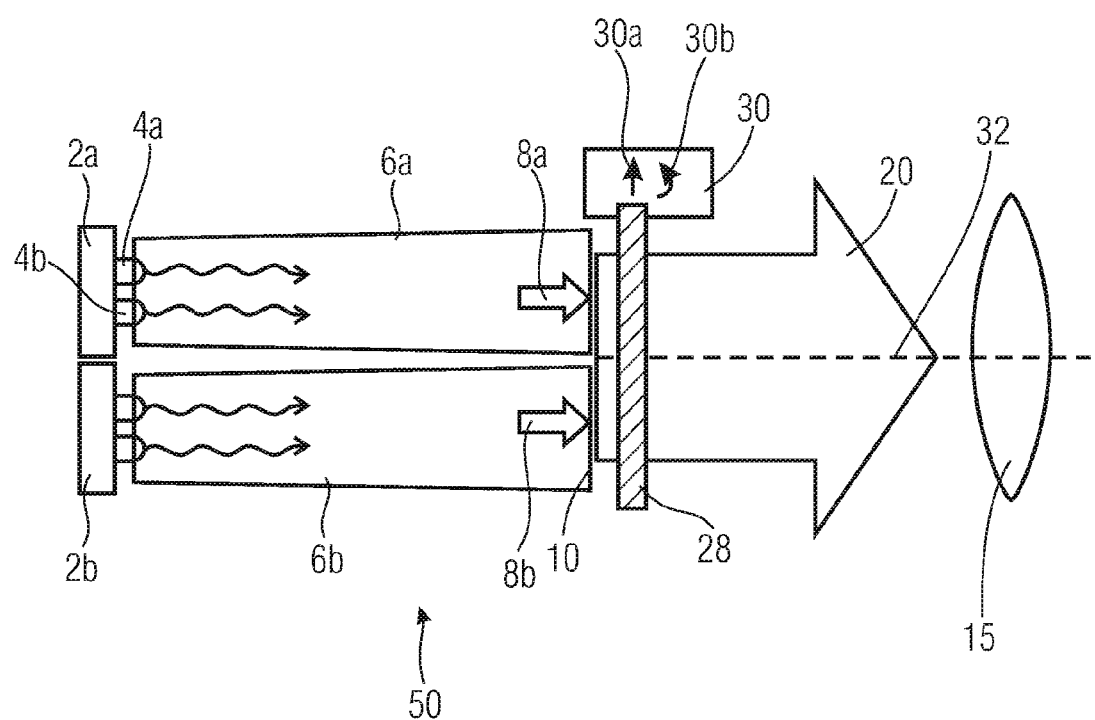
FIG. 4a shows a schematic side view of a spotlight comprising an adjustable aperture movable in the light path of the common light beam.

In FIG. 4a, a schematic cross-sectional view of a spotlight 50 that comprises LED-modules 2a and 2b with at least two LEDs 4a and 4b is shown. In front of the light mixers 6a and 6b an adjustable lens aperture 28 is arranged. The aperture 28 can be moved by means of an aperture mover 30 out of the light path 32 of the common light beam 20. The aperture mover 30 can be configured to rotate 30b the aperture 28 in or out of the light path 32. The focal aperture of the aperture 28 can be continuously variable enlarged or minimized.

According to another embodiment, the aperture mover 30 can be configured to linearly move or remove 30a the aperture 28 in front of the exit surfaces 10 of the light mixers 6a, 6b. The adjustable lens aperture 28 can, for example, be an adjustable iris lens, wherein the focal aperture can be manually or automatically changed, so that the cross-section of the light beam is adjustable. If the exit surfaces 10 of the light mixers are, for example rectangular, and hence the common light beam 20 is rectangular as well, a circular aperture 28 can be used to change the rectangular shape of the common light beam 20 in a circular shape. The cross-section can continuously be changed in a circular common light beam 20 by means of the iris aperture.

The shape of a rectangular common light beam 20 can be in a focused state rectangular or quadratic and in a defocused state more circular for an observer, since the defocused beam edges are more faded. A possibility to obtaining a circular focused common light beam is to directly mount a large iris aperture behind the exit surfaces 10 of the light pipes or light mixers 6. This iris aperture can be opened so that the diameter of the opening corresponds with the length of the square of the light mixer matrix. The use of the aperture to form a circular common light beam may result in a light loss but as an advantage the full light power is available to the quadratic light beam. The focusing optics 15 may be arranged with respect to an optical axis 32 of the spotlight 50.

Figure 4B:
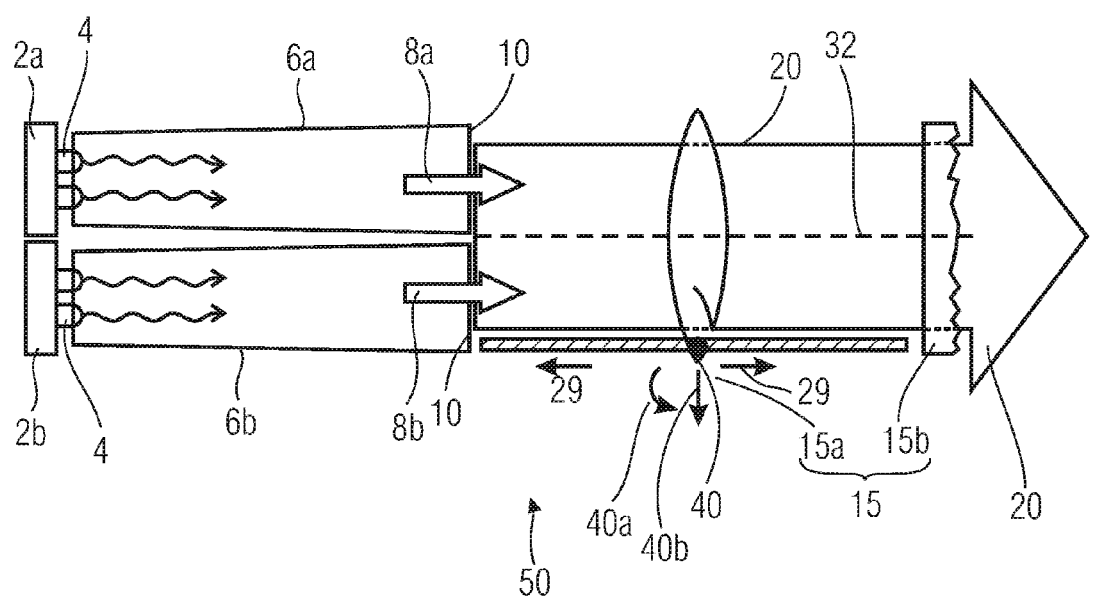
FIG. 4b shows a schematic side view of a spotlight comprising a movable zoom lens and objective lens according to an embodiment of the invention.

In FIG. 4b a schematic side view of a spotlight 50 with a zoom lens 15a and an objective lens 15b that form the focusing optics 15 of the spotlight is shown. The zoom lens 15a and the objective lens 15b are centrally arranged to an optical axis 32 of the spotlight 50. The zoom lens 15a is movable 29 between the exit surfaces 10 of the light mixers 6a, 6b, and the objective lens 15b. The spotlight 50 may comprise an lens mover configured to linearly move the zoom lens between the exit surfaces 10 and an objective lens 15b of the spotlight. The spotlight may comprise a zoom lens mover 40 which is configured to rotate 40a the zoom lens or to move or remove linearly 40b the zoom lens 15a in the light path 32 of the spotlight 50. The zoom lens 15a may be configured to focus or defocus the common light beam 20 on a projection screen (not shown in FIG. 4b). Depending on the distance between the exit surfaces 10 and the objective lens 15b, the focal point for the spotlight 50 can be changed. The movement of the zoom lens 15a can be performed manually or in an automatic manner by means, for example, of an electric motor. The zoom lens may be a biconvex, a plano-convex, or a concave-convex lens.

According to some embodiments, the focusing optics 15 may comprise a plurality of lenses, wherein the lenses can be moved between the exit surfaces 10 and the objective lens 15b in order to focus or defocus the common light beam. The optical lens system 15 may also comprise diverging lenses, for example, biconcave, plano-concave, or convex-concave lenses.

Figure 4C:
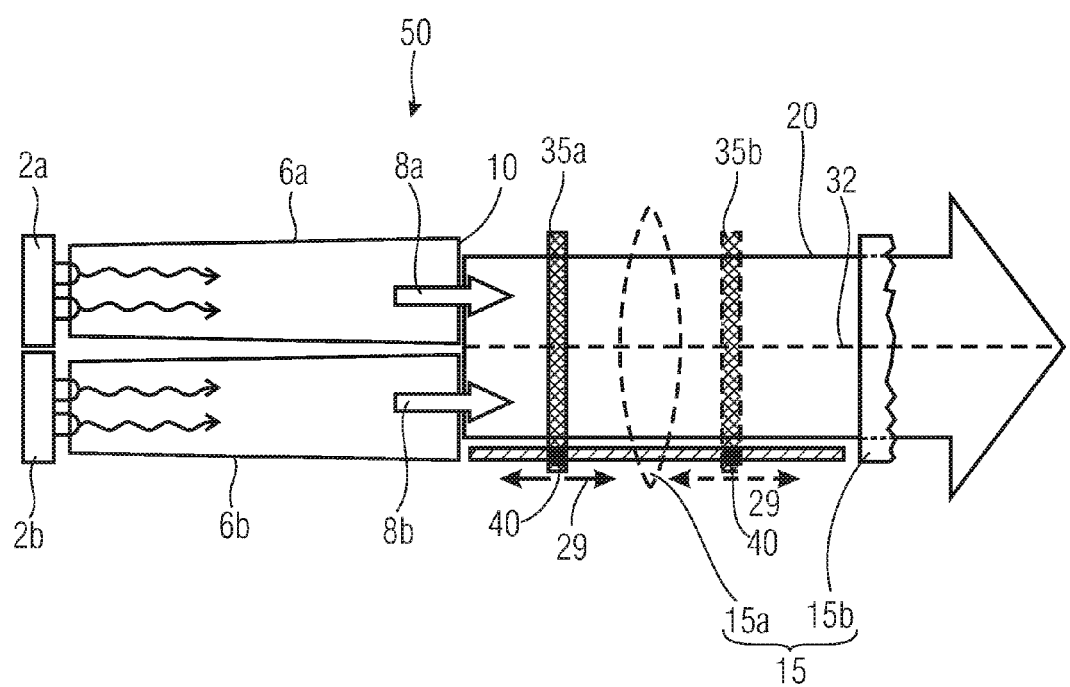
FIG. 4c shows a schematic side view of a spotlight which comprises a beam shaping diffuser in the light path of the common light beam.

In FIG. 4c another schematic side view of a spotlight is depicted. In this embodiment, the spotlight 50 comprises furthermore a beam shaping diffuser 35a that is movable along a light path direction 29 of the common light beam 20 between the exit surfaces 10 of the light mixers 6a, 6b, and an objective lens 15b of the focusing optics 15.

A beam shaping diffuser may be a beam a shaping diffuser foil from the company Luminit. Such a beam shaping diffuser foil has a high transmission efficiency depending on the wave length of the incident light. The transmission efficiency may be up to 98%, for example, between 80% and 95%. The beam shaping diffuser 35a may comprise a low back scattering and utilize light that would otherwise be wasted due Fresnel loss. The beam shaping diffuser may comprise small lenslets at a surface which comprises a certain structure so that an incident light is refracted in a preferred direction, whereas the refraction in the perpendicular direction or plane is smaller.

According to another embodiment, a beam shaping diffuser 35b is arranged between a zoom lens 15a and an objective lens 15b of the focusing optics 15. The beam shaping diffuser 30b is movable between a zoom lens 15a and the objective lens 15b. A beam shaping diffuser 35a, 35b may comprise roughnesses at one side which act like a plurality of small lenses. It may be a foil with roughnesses on one side and with a smooth second side. If the roughnesses comprise a certain shape, an optical preferred direction for the refraction of a passing light beam may be defined.

The beam shaping diffuser may be adapted to precisely light beam shape control and distribute light. In addition the beam shaping diffuser 35a may be configured to shape the light beam in separate vertical and horizontal angles. Such a beam shaping diffuser may be an elliptical or circular beam shaping diffuser wherein the horizontal angle of the refracted light may vary between 0.1° and 95°, and the vertical angle may vary between 0.1° and 95°. If now, such a beam shaping foil, for example, with a fixed elliptical vertical horizontal diffusion angles, for example, 1°×60° is moved from the exit surfaces 10 in the direction of the objective lens 15b along the light path 32, the common light beam 20 can be variably distorted up to an angle of 95°. This means that if the beam shaping diffuser 35a is moved in the light path 32 from the exit surfaces 10 to the objective lens 50b, the common light beam can be refracted in a large range of angles, depending on the distance between the exit surfaces and the beam shaping diffuser 35a.

The beam shaping diffuser 35a which is movable between the exit surfaces 10 of the light mixers 6a, 6b, and the objective lens 15b is configured to continuously change the ratio of the height to the width of the common light beam 20 depending on the distance between the exit surfaces 10 of the light mixers 6a, 6b and the beam shaping diffuser 35a. The beam shaping diffuser can be adapted to refract an incident light beam in one preferred plane or direction stronger than in a perpendicular direction to it. As a result the shape of a circular light beam can be an oblong, more oval light beam. Such a beam shaping element may be a riffle glass that is on one side smooth and that comprises on the other side an area of half cylinder lenses. The half cylinder lenses refract the incident light beam preferred in one direction whereas they have almost no refractive effect in the perpendicular direction. According to embodiments, the beam shaping diffuser can be rotated in the light path 32 and may be rotatable around the optical axis 32 of the spotlight 50. By means of the beam shaping diffuser oblong objects can be illuminated better.

According to embodiments, the ratio of the height and width of a light beam can be infinitely variable adjusted depending on the distance between the exit surfaces 10 and the beam shaping diffuser 35a. This means that the common light beam 20 can be continuously distorted without a fixed factor or ratio between the height and the width of the light beam. Thus, even if the ratio between the height and the width of an object to be lightened up does not correspond to a fixed distortion factor, the beam shaping diffuser as described herein can be used, since the ratio between the height and the width of the common light beam can be continuously changed. In some embodiments a single beam shaping diffuser may be sufficient to control the height to width ratio of the common light beam.

In embodiments a beam shaping diffuser 35b can be mounted in the light path 32 between a zoom lens 15a and a objective lens 15b. The beam shaping diffuser 35b is movable between the zoom lens 15a and the objective lens 15b. The length extension or the width of the common light beam can be adjusted by changing the distance between the zoom lens 15a and the beam shaper 35b. In other words, the length extension of the common light beam can be adjusted by moving the beam shaper diffuser between the zoom lens 15a and the objective lens 15b.

According to this embodiment, a spotlight 50 can comprise a beam shaping diffuser 35b, which is movable along the light path direction 29 of the common light beam 20 between a zoom lens 15a and an objective lens 15b of the focusing optics 15, wherein the beam shaping diffuser 35b is configured to continuously change the width of the common light beam 20, dependent on the distance between the zoom lens and the beam shaping diffuser 35b.

The shape of a round common light beam 20 can be infinity variably adjusted from a round light beam shape to an extremely oblong light beam by means of a beam shaping diffuser 35a, 35b. The beam shaping diffuser which may be used, for example, in so-called washlights, can be swiveled in the light path of the common light beam 20 and rotated around the optical axis 32. By moving the beam shaping diffuser along the optical axis the common light beam can be continuously changed with respect to its effect intensity. Furthermore, by the combination of the zoom lens and the beam shaping diffuser, more degrees of freedom with respect to the achievable optical effects can be obtained. The size of the common light beam, as well as the ratio between height and width of the common light beam, can be infinitely variable adjusted.

Figure 4D:
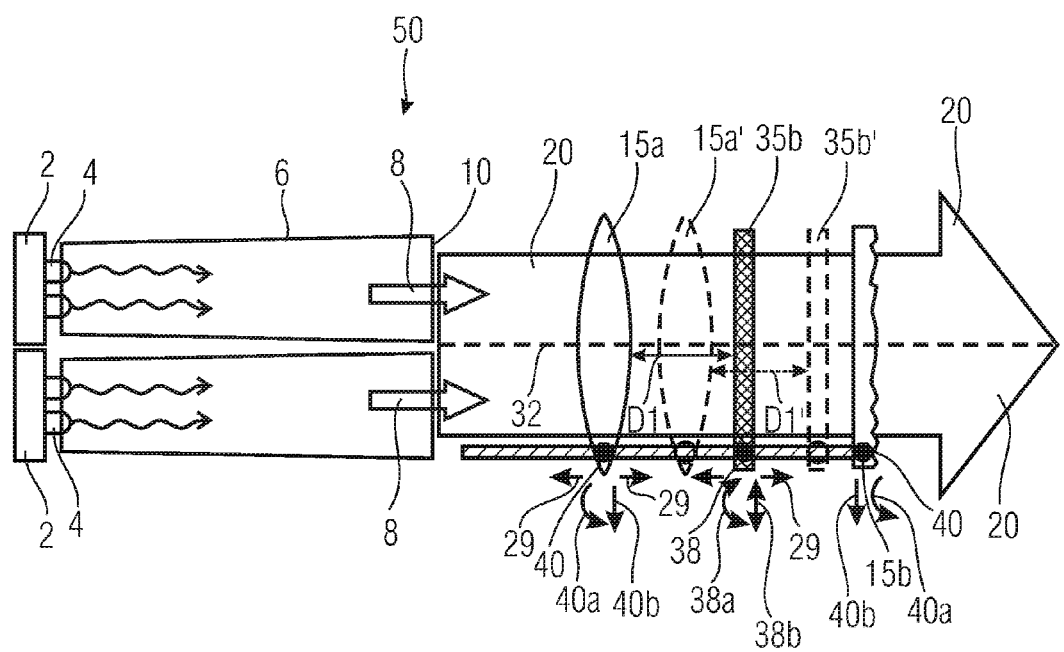
FIG. 4d shows a schematic side view of a spotlight comprising a zoom lens and a beam shaping diffuser which are moved at the same distance to each other along the light path direction of the common light beam.

In FIG. 4d, another schematic side view of a spotlight 50 according to an embodiment is shown. In this embodiment, the spotlight comprises a zoom lens 15a and an objective lens 15b in the light path 32. In between, a beam shaping diffuser 35b is arranged, wherein the beam shaping diffuser and the zoom lens are both movable between the exit surfaces and the objective lens 50b along the direction 29 of the light path 32. Each of the zoom lens 15a and the objective lens 15b may comprise a lens mover 40 that is configured to move or rotate each of the two lenses separately in or out of the light path 32.

Furthermore, the beam shaping diffuser may comprise a beam shaping diffuser mover 38 that is configured to move 38b and remove or rotate 38a the beam shaping diffuser 35b in the light path 32 of the common light beam 20. The beam shaping diffuser or filter may comprise a high optical efficiency.

According to this embodiment, the size of the common light beam, and therefore also the spot size on a projection screen of the common light beam, can be continuously changed if the zoom lens 15a and the beam shaping diffuser 35b are moved together in a fixed distance D1 to each other between the exit surfaces 10 and the objective lens 15b. In other words, as it is schematically shown by the dashed line zoom lens 15a and the dashed line beam shaping diffuser 35b, if the zoom lens and the beam shaping diffuser are simultaneously moved without changing the distance D1 between themself, the spot size of the common light beam 20 can be continuously changed.

According to this embodiment, a spotlight 50 may comprise a beam shaping diffuser 35b that is movable along a light path direction 29 or along an optical axis 32 of the common light beam 20 between a zoom lens 15a and an objective lens 15b of the focusing optics 15, wherein the beam shaping diffuser 35b is configured to continuously change the width of the common light beam, dependent on the distance D1 between the zoom lens 15a and the beam shaping diffuser 35b, and wherein the zoom lens 15a is movable 29 along a light path 32 of the common light beam 20 between the exit surfaces 10 of the light mixers 6a, 6b, and the objective lens 50b, so that the height and the width of the common light beam is continuously changeable if the beam shaping diffuser and the zoom lens are moved in a fixed distance to each other along the light path of the common light beam.

It is to be understood that various changes may be made in adapting the different embodiments of the invention without departing from the broader concepts disclosed herein.

Figure 4E:
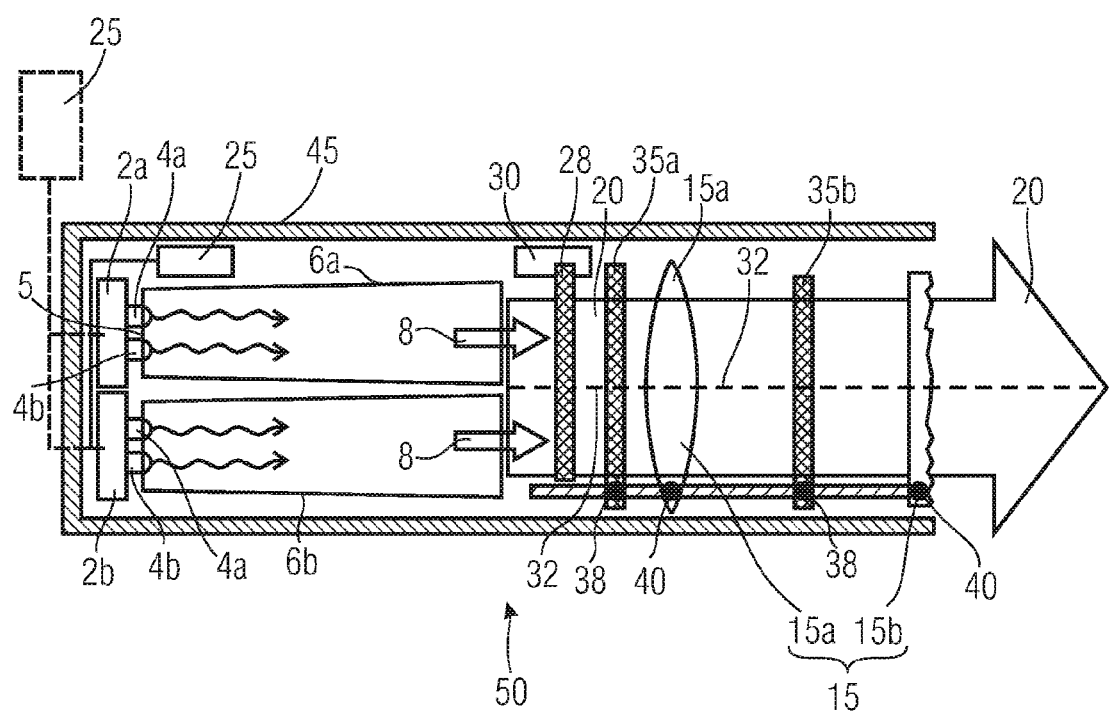
FIG. 4e shows a schematic side view of a spotlight in a housing according to an embodiment of the invention.

In FIG. 4e the spotlight 50 is depicted according to another embodiment, wherein the spotlight comprises a combination of optical elements shown and explained in different embodiments and figures herein.

The spotlight 50 may comprise a housing 45, wherein the elements which are disclosed herein are mounted. The light emitting diode modules 2a, 2b may comprise at least two light emitting diodes 4a, 4b with different light emission spectra. The spotlight 50 may furthermore comprise light mixers 6a, 6b, each light mixer is arranged at one side 5 in cooperation with an assigned LED module 2a, 2b and each light mixer 6a, 6b is configured to mix the different light emission spectra of the at least two LEDs 4a, 4b, of the assigned LED-modules 2a, 2b to form separate light beams 8a, 8b. Exit surfaces 10 at the other side of the light mixers are arranged next to each other in a matrix, an array or a row so that the light beams 8a, 8b of the light mixers 6a, 6b form a common light beam 20 and a focusing optics 15 comprising at least a zoom lens 15a and an objective lens 15b. The spotlight 50 may furthermore comprise a lens aperture 28 in front of the light mixer which is configured, for example, to change a rectangular common light beam in a round beam with a sharp edge.

The spotlight 50 may furthermore comprise a first beam shaping diffuser 35a arranged between the aperture 28 and the zoom lens 15a and a second beam shaping diffuser 35b arranged between the zoom lens 15a and the objective lens 15b. The aperture 28, the first 35a and the second beam shaping diffuser 35b and the lenses 15a, 15b may comprise means to be moved or removed in the light path 32 of the common light beam 20. The optical elements may be movable along the optical path between the exit surfaces and the objective lens. The spotlight 50 may furthermore comprise an electrical control circuit 25 which is configured to control the light emission of each of the LEDs in each LED-module. The electrical control circuit 25 can be integrated in the spotlight 50 or may be an external electrical control unit 25 (dashed line in FIG. 4e).

According to embodiments, the electrical control circuit may be configured to control in a multi-color mode or in a color patch mode the common light beam, so that the common light beams shines in one color, or may be separated into different portions wherein each portion of the common light beam can comprise a different color and intensity.

By means of the beam shaping diffuser 35a, 35b and the zoom lens 15a, any common light beam spot shape can be obtained. This means that any rectangular or round area on a projection screen can be lit up by the spotlight 50. Due to the fact that the common spotlight can be separated in color and intensity, special optical effects and impressions can be achieved for an observer.

A spotlight may comprise a plurality of light emitters, i.e. LED-modules which are adjustable in color and light power, wherein the plurality of light emitters form together one common light beam wherein the common light beam is separable in terms of color and brightness. The LED emitters 4a, 4b may be controlled by a pulse width modulation or a forward current adjusting. Power may be applied periodically to control a dimming or color mixture degree of the light emitted by the light emitters 4a, 4b. Controlling may be performed by the electrical control circuit. The LEDs of the chips or LED-modules 2a, 2b may have a modulation rate higher than approximately 1000 Hz. A duty cycle may, for example, be greater than 15%-20%, as the eye of an observer will tend to perceive the peak current light level rather than the average current light level. The LED emitters 4a, 4b may be high power LEDs being capable of continuous use of powers above 1 W. Each chip or LED-module 2a, 2b may, for example, integrate four LED emitters, each of them being capable of using a current of about 5 A or higher per color resulting in a full current of about 20 A per module. The chips 2a, 2b may comprise an array of light emitters 2a, 2b which are arranged in a high packing density. LED dies may be densely mounted on a substrate to provide a high average luminance at a small aperture of the light emitters 4a, 4b.

Figure 4F:
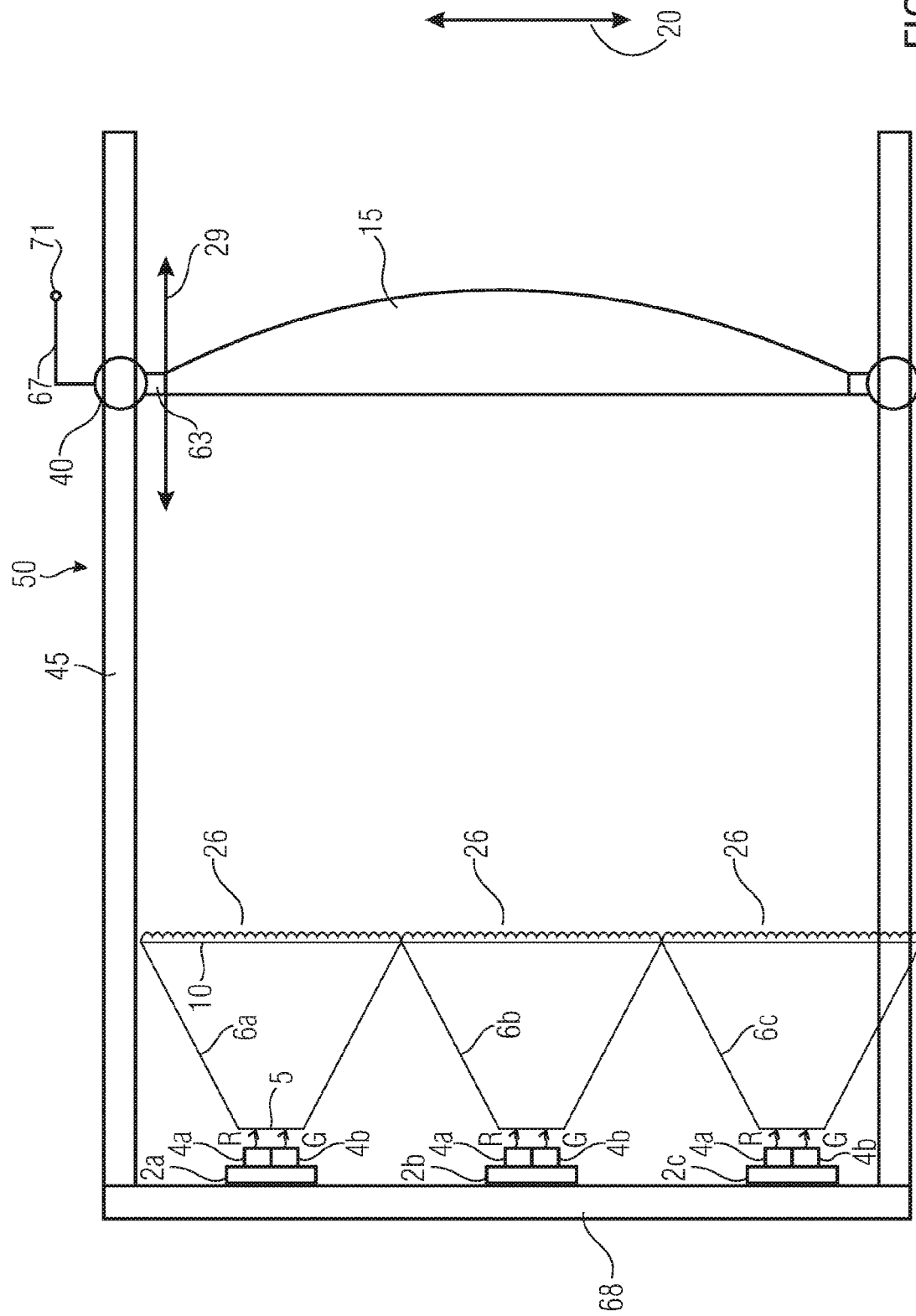
FIG. 4f shows a schematic side view of an apparatus for outputting light according to another embodiment of the invention.

According to another embodiment (FIG. 4f) an apparatus 50, for example a spotlight, may be configured to output a common light beam 20. The apparatus 50 may comprise a plurality of light mixers 6a, 6b, 6c described herein with associated mixing structures 26 described. The light mixers 6a, 6b, 6c are used to mix a plurality of light beams, for example red light R and green light G, received from a plurality of light emitters 4a, 4b. A single lens 15 is used for collecting the light received from the plurality of light mixers 6a, 6b, 6c. The lens 15 is attached to a lens holder 63 being connected in or with the housing 45. The lens 15 may comprise a lens mover 40 which may be electrically driven, and hence, may comprise electrical terminals 67. The lens mover 40 may be also controlled by an electrical control circuit 25 or by another control unit (not shown in FIG. 4f).

In this embodiment, the light of a multiple number of arrays 2a, 2b, 2c of light emitters, for example, LEDs 4a, 4b, is collected and focused, such that an intensity of the projected mixed colored light beam 20 is higher than an intensity of a spotlight comprising only one LED-module. Instead of the single lens 15, a dome lens, a Fresnel-lens or a lens array, a fluid lens or lens array, a holographic lens or lens array or any other patterned or structural optical material having the desired beam-forming or collimating characteristics may be used.

In an embodiment the light mixers 6a, 6b, 6c and the array 2a, 2b, 2c of light emitters 4a, 4b are of the same type to facilitate a manufacturing process. Due to the form of the light mixers 6a, 6b, 6c, an arraying of the light mixers is easily to achieve. The light mixers may be arranged in a rectangular, circular, hexagonal, octagonal or in any other regular or irregular structure. The lens holder 63 may be used to move the lens 15 or the lens array in a lateral 29 direction inside the common light beam 20 in between the range of the different light mixers 6a, 6b, 6c or outside the common light beam 20 when a wide-angle light mixing is desired. The base plate 68 of the housing may comprise a common power supply connector, a common LED light control signal generator and a common heat sink.

The light mixers 6a, 6b, 6c may be light pipes or light guides which may be formed as a structure of an increasing cross sectional area from a light reception end 5 to a light output end 10. The light pipes 6a, 6b, 6c may have a tapered form, for example conical, parabolic, hyperbolic, pyramidal or some other geometrical form with increasing cross-sectional area.

The axial cross sectional profile can taper towards the light output end 10 having square, hexagonal or octagonal cross-sections. The curvature of the axial cross sectional profile may be parabolic, elliptic or hyperbolic. Alternatively, the axial cross sectional profile may comprise individual straight segments or/and individual curved segments. The increasing cross-sectional area is used to concentrate light R, G passing through the light pipe 6a, 6b and 6c. The light is focused to an outlet of the light pipes 6a, 6b, 6c arranged at the light output end 10. The light passing the light pipes 6a, 6b, 6c may be reflected by the walls of the light pipes 6a, 6b, 6c such that nearly no or only little energy is lost.

However, the light pipes 6a, 6b, 6c may also have a non-tapered form, for example parallel or nearly parallel)(±5° side walls ranging from the light reception end 5 to the light output end 10. The ends 10 may be squared, rectangular, round, hexagonally or octagonally formed, for example. The walls of the light pipe 6a, 6b, 6c are highly reflective to avoid absorption of light by the walls and to assist in beam shaping and color mixing. The wall surface or parts of the wall surface may be optically active, for example by a phosphor coating. A reflective coating or a mirrored internal surface may provide for a desired level of reflectivity. The reflective coating may be made of a highly reflective material, for example protective aluminum or protective silver.

The light mixer 6a, 6b, 6c, the light pipe respectively is made of a material having a refraction index which is higher than a refraction index of air, i.e., a refraction index higher than 1. The light mixer 6a, 6b, 6c may comprise, for example, walls manufactured of glass or plastics, e.g., polycarbonate or solid acrylic to reflect the light based on total or nearly total internal reflection and may be filled with gas. The gas may be under pressure, such that a high refraction index of the mixer 6a, 6b, 6c with respect to the refraction index of air is achieved. The walls of the light mixer 6a, 6b and 6c may be coated, for example, at the outer side facing the air, by a highly refractive coating material to achieve the high refraction index of the mixer 6a, 6b, 6c.

The light pipe or light guide may be formed of solid or hollow material. The light mixer 6a, 6b, 6c is designed to minimize the number of times light is reflected when traveling through the light mixer 6a, 6b, 6c as each reflection reduces the light intensity, and still being mixed with a high mixing degree.

Figure 5:
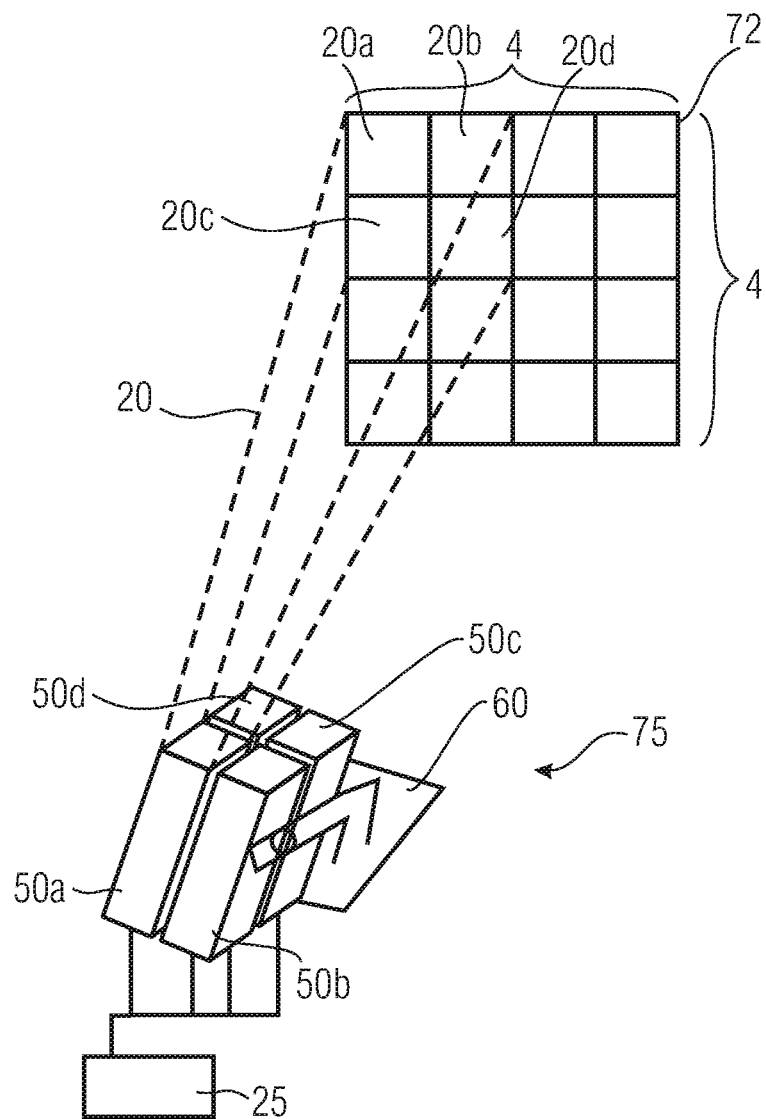
FIG. 5 shows a schematic drawing of a lighting system comprising a plurality of spotlights to project, based on the common light beams of the individual spotlights, a common projection 72 onto a projected area.
Figure 6:
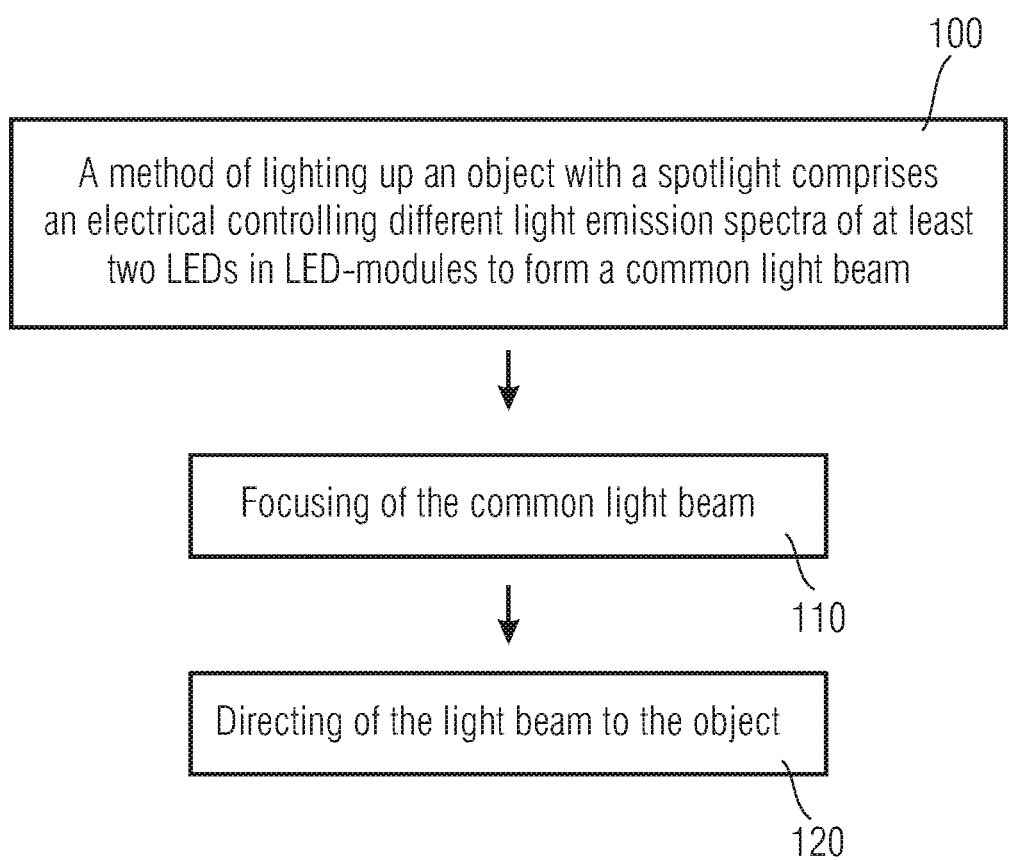
FIG. 6 shows a flow chart of the method of lighting up an object by a spotlight according to an embodiment of the invention.

According to another embodiment that is schematically depicted in FIG. 5, a lighting system 75 may comprise a plurality of spotlights 50a, 50b, 50c and 50d wherein the spotlights can be moved in all spatial directions by an spotlight mover 60. According to this embodiment, each spotlight may comprise four LED-modules, and hence, the common spotlight of each spotlight 50a, 50b, 50c and 50d may comprise four portions 20a, 20b, 20c, 20d, which can be separately controlled by an electric control circuit 25. The electrical control circuit 25 may be configured to control the LEDs of each LED-module of each spotlight 50a, 50b, 50c and 50d, so that a projection 72 of the plurality of spotlights can comprise a plurality of portions or "pixels" of the single spot lights which can be separately controlled in color and intensity. Each pixel or portion of a common light beam of a spotlight can be separately changed in color and/or intensity so that a projection 72 on a projections screen can comprise, for example, signs, letters or symbols. The resolution of the lighting system depends on the number of LED-modules per spotlight. In this example a 4×4 resolution can be achieved. This means the resolution can be improved, if the number of LED-modules and the number of spotlights is increased. This means, it is even possible, to depict pictures in a higher pixel resolution, for example, 10×10, 50×50 or even higher, by means of the lighting system 75. According to this embodiment, the lighting system 75 can project a plurality of spotlights on a projection screen wherein the projection of each spotlight is part of a larger projection 72, i.e. a matrix of the single common light beams is formed.

The lighting system 75 may comprise a plurality of spotlights according as described herein, wherein a projection 72 of the common light beams 20 of the plurality of spotlights 50a, 50b, 50c and 50d comprises in color and intensity individually controllable spots 20a, 20b, 20c and 20d or pixels. The number of individually controllable spots depends on the number of LED-modules of the plurality of spotlights.

According to an embodiment of the invention, a method of lighting up an object may refer to a spotlight. The spotlight may comprise light emitting diode modules, wherein each LED-module comprises at least two light emitting diodes with different light emitting spectra and light mixers, wherein each light mixer is arranged at one side of the light mixer in cooperation with an assigned LED module and each light mixer is configured to mix the different light emission spectra of the at least two LEDs of the assigned LED-module to form a light beam, and wherein exit surfaces at the other side of the light mixers are arranged next to each other in a matrix so that the light beams of the light mixer form a common light beam and the spotlight further comprises a focusing optics for focusing the common light beam. According to an embodiment the method may comprise electrically controlling 100 the different light emission spectra of the at least two LEDs in the LED-modules to form a common light beam and focusing 110 and directing 120 the common light beam to the object, and to light up the object. The sequence of electrically controlling 100, focusing 110 and directing 120 is variable and the steps are interchangeable.

The electrical controlling can be performed by means of a electrical control circuit so that the intensity and/or the color of the light beams that form the common light beam can be separately controlled. The method may furthermore comprise a continuously changing the size and/or the ratio of the height and width of a common light beam of the spotlight. This may be done my means of a beam shaping diffuser. According to another aspect of the invention, the method of lighting up an object may comprise the change of a rectangular common light beam shape to a round common light beam shape with a different diameter by means of an aperture.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A spotlight comprising:
light-emitting-diode (LED)-modules, wherein each LED-module comprises at least two light-emitting-diodes (LEDs) with different light emission spectra;

light mixers, wherein each light mixer is arranged at one side of the light mixer in cooperation with an assigned LED-module and each light mixer is configured to mix the different light emission spectra of the at least two LEDs of the assigned LED-module to form a light beam, and wherein exit surfaces at the other side of the light mixers are arranged next to each other in a matrix so that the light beams of the light mixers form a common light beam;

a focusing optics arranged to focus the common light beam; and an electrical control circuit configured to control the different light emission spectra of the at least two LEDs in each LED-module and wherein the electrical control circuit is configured to change separately the intensity and/or the color of the light beams of each LED-module, so that the common light beam comprises separately in color and intensity adjustable light beams, and a first state of a multi-color mode the common light beam comprises a first color and a second state of the multi-color mode the common light beam comprises a second color.

2. The spotlight according to claim 1, wherein the electrical control circuit is configured to control the different light emission spectra of the at least two LEDs in the LED-modules so that in a color-patch mode a first light beam of a first LED-module comprises a first color and a second light beam of a second LED-module comprises a second color, and wherein the intensity and/or the color temperature of first light beam and the second light beam are adjustable.

3. The spotlight according to claim 1, wherein the exit surfaces of the light mixers are rectangular, so that the light beams of the light mixers form a rectangular common light beam.

4. The spotlight according to claim 3, comprising four light mixers arranged in a 2×2 matrix, so that a rectangular common light beam is formed by the four light beams of the four light mixer, and wherein each LED-module that is assigned to a light mixer comprises four LEDs with a red emission spectrum, a green emission spectrum, a blue emission spectrum and a white or an amber emission spectrum.

5. The spotlight according to claim 1, wherein each LED-module is rectangular and comprises at one of the four side walls of the LED-module an electrical terminal for coupling the electrical control circuit to the LED-module, and wherein the LED-modules are arranged next to each other forming a combined rectangular so that at each side wall of the combined rectangular an electrical terminal is located.

6. The spotlight according to claim 1 further comprising, an adjustable aperture arranged in front of the exit surfaces of the light mixers.

7. The spotlight according to claim 1, wherein the focusing optics comprises at least a zoom lens and an objective lens arranged in the light path of the common light beam, wherein the zoom lens is movable between the exit surfaces of the light mixers and the objective lens.

8. The spotlight according to claim 1 further comprising a beam shaping diffuser, which is movable along the light path of the common light beam between the exit surfaces of the light mixers and an objective lens of the focusing optics, and wherein the beam shaping diffuser is configured to change continuously the ratio of the height to the width of the common light beam, dependent on the distance between the exit surfaces of the light mixers and the beam shaping diffuser.

9. The spotlight according to claim 8, further comprising a beam shaping diffuser mover to move and remove the beam shaping diffuser in the light path and/or a beam shaping diffuser rotator to rotate the beam shaping diffuser in the light path.

10. The spotlight according to claim 1, further comprising a beam shaping diffuser, which is movable along the light path of the common light beam between an zoom lens and an objective lens of the focusing optics, wherein the beam shaping diffuser is configured to change continuously the width of the common light-beam dependent on the distance between the zoom lens and the beam shaping diffuser.

11. The spotlight according to claim 10, wherein the zoom lens is movable along the light path of the common light beam between the exit surfaces of the light mixers and the objective lens, so that the height and the width of the common light beam is continuously changeable, if the beam shaping diffuser and the zoom lens are moved in a fixed distance to each other along the light path of the common light beam.

12. A lighting system comprising a plurality of spotlights according to claim 1, wherein a common projection of common light beams of the plurality of spotlights comprises in color and intensity individually controllable spots, and wherein the number of individually controllable spots depend on the number of LED-modules of the plurality of spotlights.

13. A method of lighting up an object, with a spotlight comprising light-emitting-diode (LED)-modules, wherein each LED-module comprises at least two light-emitting-diodes with a different light emission spectra, and light mixers, wherein each light mixer is arranged at one side of the light mixer in cooperation with an assigned LED-module, and each light mixer is configured to mix the different light emission spectra of the at least two LEDs of the assigned LED-module to form a light beam, and wherein exit surfaces at the other side of the light mixers are arranged next to each other in a matrix so that the light beams of the light mixers form a common light beam, and the spotlight further comprises a focusing optics for focusing the common light beam, the method comprising:

electrical controlling the different light emission spectra of the at least two LEDs in the LED-modules to form a common light beam;

changing separately the intensity and/or the color of the light beams of each LED-module, so that the common light beam comprises separately in color and intensity adjustable light beams and a first state of a multi-color mode the common light beam comprises a first color and in a second state a second color;

focusing of the common light beam; and directing of the common light beam to the object, to light up the object.

* * * * *